(12) United States Patent
Beck et al.

(10) Patent No.: US 6,622,751 B1
(45) Date of Patent: Sep. 23, 2003

(54) PRESSURE VALVE FOR A RECIPROCATING PUMP

(75) Inventors: Erhard Beck, Weilburg (DE); Hans-Dieter Reinartz, Frankfurt am Main (DE); Günther Vogel, Dreieich (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/601,902

(22) PCT Filed: Feb. 4, 1999

(86) PCT No.: PCT/EP99/00723

§ 371 (c)(1),
(2), (4) Date: Jan. 23, 2001

(87) PCT Pub. No.: WO99/40323

PCT Pub. Date: Aug. 12, 1999

(30) Foreign Application Priority Data

Feb. 9, 1998 (DE) .......................................... 198 05 099
Apr. 11, 1998 (DE) .......................................... 198 16 289

(51) Int. Cl.[7] .............................................. F16K 15/04
(52) U.S. Cl. .............................. 137/315.33; 137/454.4; 137/514.5; 137/539
(58) Field of Search .................. 137/512, 543.19, 137/533.19, 539, 315.33, 454.2, 454.4, 514.5, 539.5; 251/361

(56) References Cited

U.S. PATENT DOCUMENTS

| 2,550,840 | A | | 5/1951 | Martin et al. |
| 3,735,777 | A | * | 5/1973 | Katzer et al. ............. 137/514.5 |
| 3,835,884 | A | * | 9/1974 | Ishikawa et al. ............ 137/550 |
| 3,916,496 | A | | 11/1975 | Freiheit |
| 4,239,154 | A | * | 12/1980 | Inada et al. .................... 236/87 |
| 4,482,129 | A | | 11/1984 | Baker et al. |
| 4,530,319 | A | * | 7/1985 | Honda ................... 123/90.46 |
| 4,603,838 | A | * | 8/1986 | Gotch ......................... 251/361 |
| 4,621,598 | A | * | 11/1986 | Miura ..................... 123/90.46 |
| 4,645,043 | A | * | 2/1987 | Imaizumi ..................... 188/319 |
| 4,834,134 | A | * | 5/1989 | Asami et al. ............. 137/493.3 |
| 4,862,856 | A | * | 9/1989 | Yokoe et al. ................ 123/519 |
| 5,096,400 | A | | 3/1992 | Budecker et al. |
| 5,626,403 | A | * | 5/1997 | Beck et al. ............... 303/117.1 |
| 5,649,360 | A | * | 7/1997 | Schwarz ................. 29/890.13 |
| 6,067,963 | A | * | 5/2000 | Oi et al. ...................... 123/458 |
| 6,073,646 | A | * | 6/2000 | Kimura ...................... 137/315 |
| 6,131,826 | A | * | 10/2000 | Teiwes ..................... 137/90 X |

FOREIGN PATENT DOCUMENTS

| DE | 23 38 489 | 2/1975 |
| DE | 28 16 806 | 10/1979 |
| DE | 35 20 352 | 12/1986 |
| DE | 38 40 182 | 5/1990 |
| DE | 90 10 459 | 10/1990 |
| DE | 90 17 394 | 4/1991 |
| DE | 91 06 783 | 10/1991 |
| DE | 41 38 305 | 5/1992 |
| DE | 42 39 362 | 5/1994 |
| DE | 44 07 978 | 9/1995 |
| DE | 44 28 385 | 2/1996 |
| DE | 195 33 741 | 3/1997 |
| DE | 197 32 792 | 2/1999 |
| DE | 197 41 249 | 3/1999 |
| EP | 0 359 386 | 3/1990 |
| EP | 0 461 808 | 12/1991 |
| EP | 0 726 110 | 8/1996 |

* cited by examiner

Primary Examiner—John Rivell
(74) Attorney, Agent, or Firm—Rader, Fishman & Grauer PLLC

(57) ABSTRACT

A pressure valve, particularly for a reciprocating piston pump for conveying pressure fluid in slip-controlled hydraulic brake systems, wherein the pressure valve has a valve seat body and a valve cover body with a pre-tensioning element and a valve element installed in the space formed between the valve seat body and the cover body, which is particularly economical to manufacture, easy to install and particularly safe because of the valve seat body and the valve cover body being manufactured by non-cutting process.

20 Claims, 4 Drawing Sheets

PRESSURE VALVE FOR A RECIPROCATING PUMP

TECHNICAL FIELD

The present invention generally relates to valves, and more particularly relates to a pressure valve for a reciprocating pump for conveying pressure fluid in slip-controlled hydraulic brake systems.

BACKGROUND OF THE INVENTION

A pressure valve of this general kind is disclosed in DE 44 07 978 A1. The pressure valve described in this paper is part of a hydraulic pump which is used for conveying pressure fluid in hydraulic brake systems. In addition to the pressure valve, the hydraulic pump also has a suction valve and a pump piston. The function of the hydraulic pump consists of conveying by piston action the brake fluid into the brake circuit when required. Pressure and suction valve are controlled by pressure. The stroke movement of the pump piston is generally generated by a cam on the drive shaft of an electric motor.

The pressure valve as defined in this state of the art, is threaded into the pump housing by a thrust piece with screw connection (cf. FIG. 2 as well as column 4, lines 17 to 21). The connection of the valve seating and thrust piece or valve cover is by way of a pliable seal (e.g. by caulking). This known form of design means that the pressure valve has to be manufactured by cutting process such as turning or milling. This means not only high manufacturing costs and tolerance requirements but also the disadvantage with components manufactured by metal-cutting, especially valves manufactured by metal-cutting, that shavings can get into the brake circuit which can restrict the function of the brake system and therefore the vehicle's safety. Another disadvantage of the known pressure valve is that the screw connection of the pressure valve to the pump housing can be altered after installation meaning that manipulation is possible to the brake system by unauthorized persons.

SUMMARY OF THE INVENTION

The object of the present invention is to overcome the disadvantages of the state of the art and in particular to create a valve or pressure valve which is economical to manufacture, easy to install and particularly safe with regard to function.

This object is achieved by the invention of a pressure valve of the type named initially wherein the valve seat and/or the valve cover body are manufactured by non-cutting means. Preferred means of manufacture of the valve seat body and/or the valve cover body of the pressure valve are forming, reforming, punching, stamping and similar.

In a preferred embodiment of the present invention, the pressure valve is caulked into the pump housing. This type of fastening of the pressure valve provides a connection of the pressure valve with the housing which is safe against manipulation and pressure-resistant. In connection with a pressure valve with individual parts that have been manufactured by non-cutting means, this type of fastening offers a distinct advantage because caulking the pressure valve is also possible even if the valve cover, for example, has no thread for fastening into the pump housing or the valve block.

A preferred embodiment of the present invention shows the pressure valve as an autonomous installation subassembly suitable for handling. This has the advantage that it simplifies the installation of the pressure valve in a hydraulic pump and allows the pressure valve to be tested externally and separately prior to installation.

According to a possible embodiment, an adhesive joint is provided for the connection of the valve seat body and the valve cover body. The adhesive used is preferably a micro-encapsulated adhesive which does not have to be resistant to brake fluid because the connection of the valve seat body and the valve cover body is only necessary as an installation aid and during a test phase prior to installation.

According to another embodiment the pressure valve has a connecting device for connecting the valve seat body to the valve cover body. This connecting device is preferably in the form of a spring cup in which the spring is guided, wherein the spring cup preferably has at least one opening for the connection of the valve interior with a pressure fluid consumer.

A further preferred embodiment of the present invention has a self-locking connection between the valve seat body and the valve cover body. This is preferably realized by contacting angled surfaces.

The valve seat body and/or the valve cover body should preferably have at least one opening for the connection of the valve interior with a pressure fluid consumer. A particular advantage can be achieved by the valve seat body and/or the valve cover body having a further opening for controlling the resulting ball force.

DETAILED DESCRIPTION OF THE PREFERRED EMBODIMENTS

Figure 1:
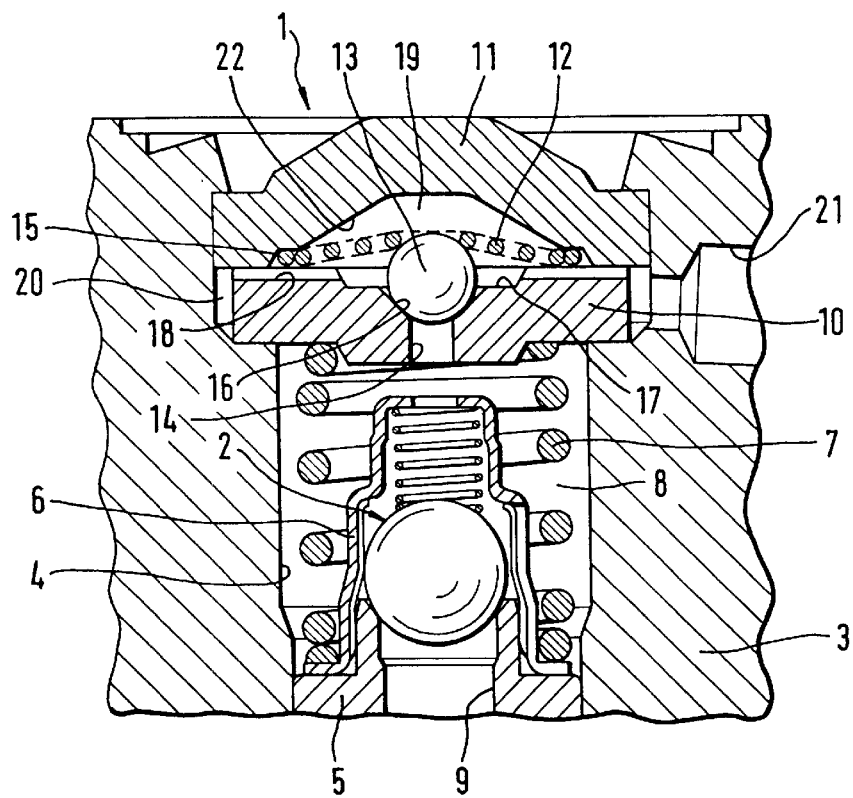
FIG. 1 a longitudinal section through a first embodiment of a pressure valve according to the present invention.

FIG. 1 contains a sectional view of a first embodiment of a pressure valve 1 according to the present invention, in particular of a hydraulic pump. The hydraulic pump can be used in particular for ABS Anti-Lock Braking System), ASR (Anti Slip Regulator), ASMS (Automatic Stability Management System) or ESP (Electronic Stability Program) in a controlled brake system. A coaxial suction valve 2 is connected upstream of the pressure valve 1. The pressure valve 1 and the suction valve 2 are located in the valve block or pump housing 3. It can be seen from FIG. 1 that the pressure valve 1 which is preferably designed as an autonomous assembly unit suitable for handling is caulked into pump housing 3. Suction valve 2 is located in a guiding hole 4 of pump housing 3. Guiding hole 4 is sealed pressure tight outwardly by pressure valve 1 which cannot be removed without destruction. A pump piston 5 is moved back and forth in guiding hole 4 by a cam (not shown) on a drive shaft (also not shown). Suction valve 2 is fastened onto piston 5 by a retaining cage 6. A reset spring 7 is located in pressure chamber 8 in the space between the bent end section of the retaining cage 6 and the pressure valve 3. Suction valve 2 abuts on a suction channel 9 formed in pump piston 5.

Pressure valve 1 of a predominantly rotationally symmetrical design has a valve seat body 10, a valve cover body 11 and a spring 12 in between. The valve seat body 10 and the valve cover body 11 are preferably punched or stamped parts. The spring 12 in this embodiment consists of a predominantly planar spiral spring which presses a ball or a valve element 13 against a central hole 14 in valve seat body 10. On its outside spring 12 is held between the valve cover body 11 and the valve seat body 10 in a ring-shaped recess 15 in the valve cover body 11. The spring 12 is virtually flat in an unloaded state and can therefore be mounted unaligned.

Furthermore, this design of the spring 12 makes the pressure valve particularly shallow. The valve seat is formed by a conical recess 16 adjoining and concentric to the central hole 14. The diameter of the hole 14 corresponds approximately to the radius of the ball 13. The outer diameter of the recess and the valve seat 16 is a little larger than the diameter of the ball 13. A shallow recess 17 is formed in the valve seat body 10 around the recess 16. Engraved grooves or openings 18 extend outwards radially from the shallow recess 17 into the valve seat 10 in order to conduct fluid out from the space 19 formed between the valve cover body 11 and valve seat body 10. The grooves 18 are connected with a ring chamber 20 formed between the inner wall of the pump housing 3, the outer circumference of the valve seat body 10 and section of the valve cover body extending radially over the valve seat body 10. Said ring chamber 20 itself is connected to a channel 21 which leads to a pressure fluid consumer such as the wheel brakes of a hydraulically controlled brake system. The space 19 is formed by a dome-shaped projection 22 on the side of the valve cover body 11 facing the valve seat body 10 which is achieved by the concave form, e.g. by embossing, of the valve cover body 11.

As one can see from the illustration in FIG. 1, the thickness of the valve seat body 10 and the thickness of the valve cover body 11 is mainly constant which is a particular advantage for non-cutting production. The valve seat and the valve cover body 10 and 11 can therefore be manufactured easily from a metal panel or similar.

When in operation, during a pressure stroke phase, a stroke movement of the piston 5 causes a pressure increase in pressure chamber 8 which opens the pressure valve 1 against the pretension of spring 12 and the pressure or brake fluid is transported through the grooves 18, the ring channel 20 and the channel 21 to a pressure fluid consumer, e.g. the wheel brakes.

Figure 2:
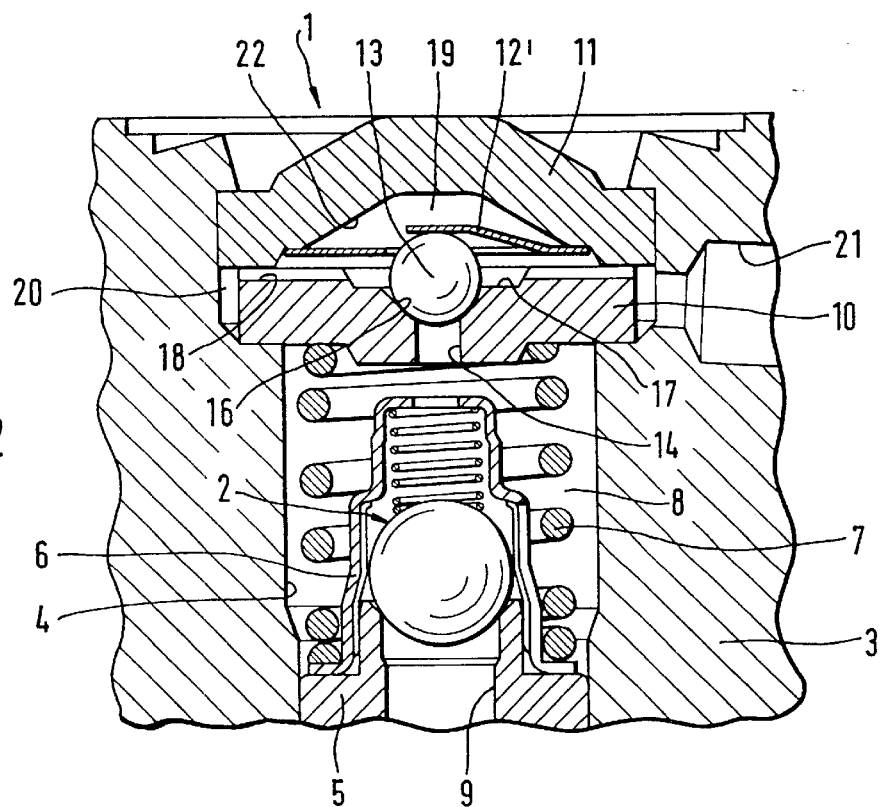
FIG. 2 a sectional view of a second embodiment of a pressure valve according to the present invention.

The second embodiment of an pressure valve according to the present invention shown in FIG. 2 has a thin sheet metal plate 12' instead of the spring 12 and can also be described as a plate spring. A tongue stamped out of the plate spring 12' presses the ball 13 against the valve seat 16. The use of the plate spring 12' provides a particularly flat design form just as the use of a spring 12 which is planar when in an unloaded state.

Figure 3:
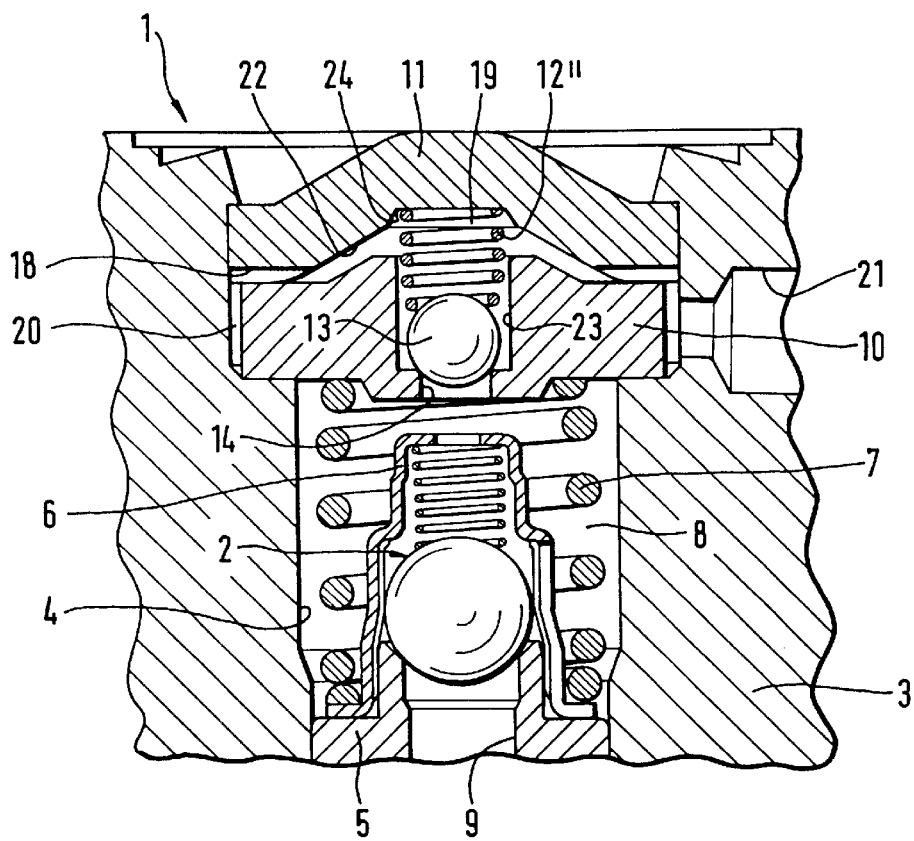
FIG. 3 a longitudinal view of a third embodiment of a pressure valve according to the present invention.

In the case of the third pressure valve 1 according to the present invention as shown in FIG. 3, a coil spring 12" has been used instead of the spiral spring 12 (cf. FIG. 1). In this case, the coil spring 12" is guided in the valve seat body 10.

Therefore, instead of the conical recess 16 (cf. FIGS. 1 and 2) the valve seat body 10 has a recess 23 in the bottom section of which the ball is located. The diameter of hole 23 is a little larger than the diameter of ball 13 and the coil spring 12". The valve seat body 11 is thicker in an inner radial section with the recess 23 than at its edge so that a sufficient section of the spring 12" and the ball 13 fit in it for guiding of the spring 12". An upper section of the hole 23 facing the valve cover body 11 serves to guide an end section of the coil spring 12" above the ball 13. The end section of the coil pressure spring opposite this end section is mounted in a step-like section 24 in the valve cover body 11. The recess 23 and the section 24 have approximately the same diameter, face each other and are arranged in a coaxial position to each other. In the embodiment shown in FIG. 3, the grooves or openings 18 are located in an edge section of the valve cover body 11 instead of in the valve seat body 10.

Figure 4:
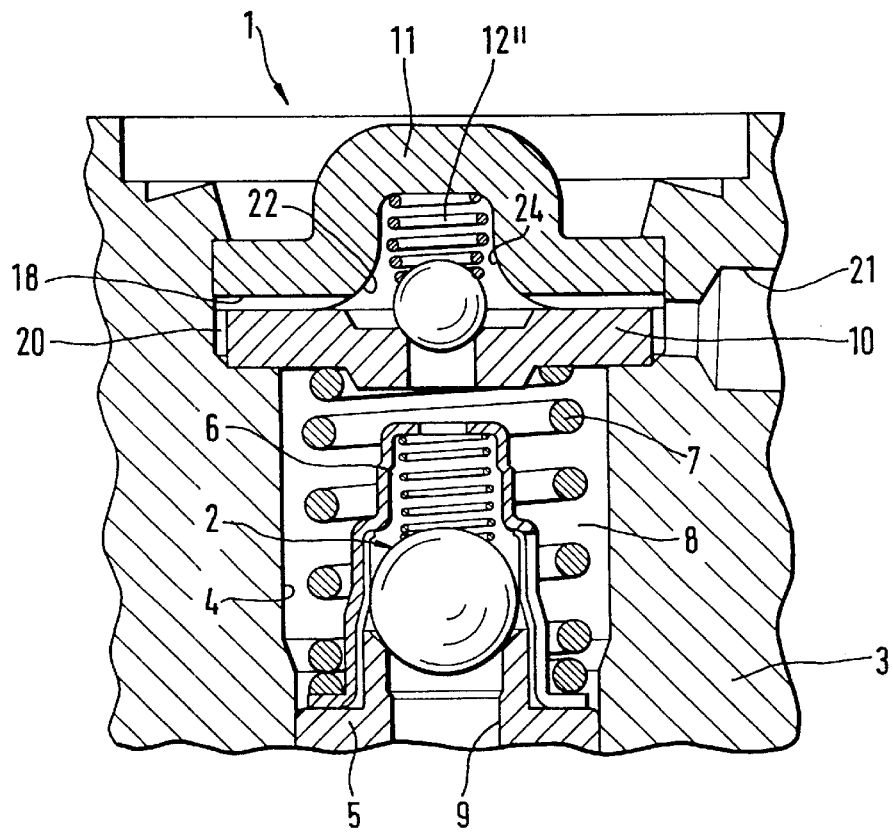
FIG. 4 a sectional view of a fourth embodiment of a pressure valve according to the present invention.

FIG. 4 shows a fourth embodiment of the present invention. Unlike the design example shown in FIG. 3, in this case the coil spring 12" is mounted in the valve cover body 11. Instead of the recess 23 in the valve seat body 10, the projection 22 in the valve cover body 11 has an engraved, mainly pot-shaped section 24 in which is fed an end section of the spring 12" opposite the ball 13. In the case of the embodiment shown in FIG. 4, the grooves 18 are formed in an edge section of the valve cover body 11 instead of the valve seat body 10.

Figure 5:
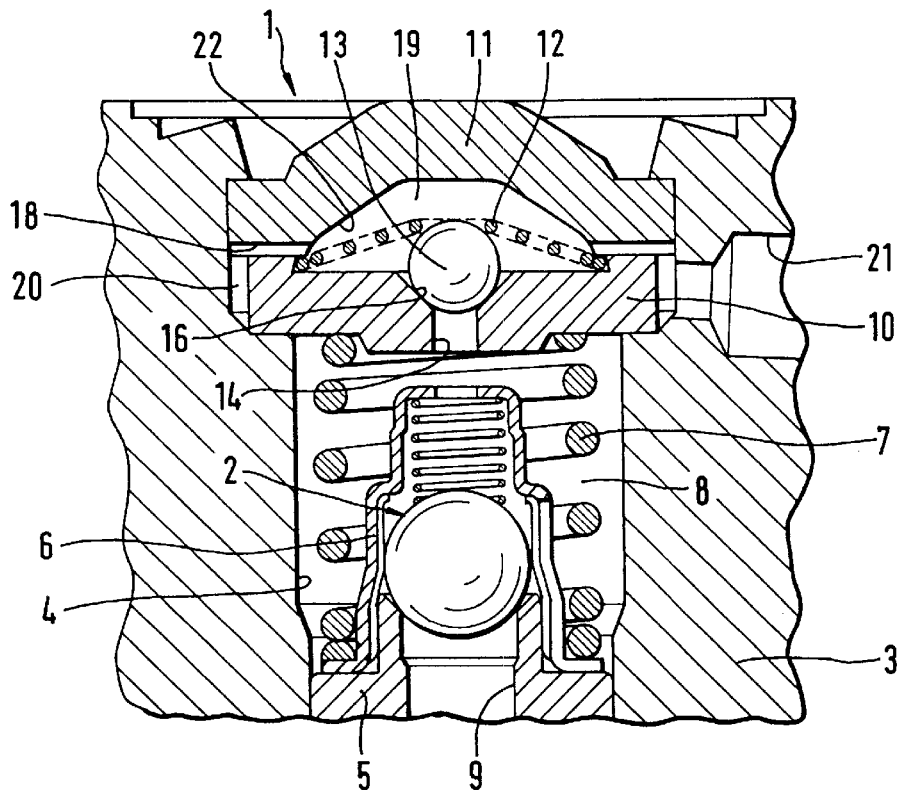
FIG. 5 a longitudinal view of a fifth embodiment of a pressure valve according to the present invention.

The fifth embodiment of the pressure valve 1 according to the present invention shown in FIG. 5 is on the whole similar to the embodiment shown in FIG. 1 with the main difference, however, that the spring 12 is fastened onto the valve seat body 10 for example by caulking. This is shown schematically in FIG. 5. As with the embodiments shown in FIGS. 3 and 4, the grooves 18 are formed in the valve seat body 11.

Because of the effect of the piston reset spring 7, pressure valve 1 is preferably designed as a separate mounting unit suitable for handling. In the case of the pressure valve 1 according to the present invention as shown in the embodiments shown in FIGS. 1 to 5, the valve seat body 10 and the valve cover body 11 are fastened to the facing ring-shaped outer sections, for example, by welding connection or adhesive or glue connection. In the latter case, a micro-encapsulated adhesive can be used which only becomes active when the valve seat body 10 and the valve cover body 11 are pressed together. The adhesive used does not have to be resistant to brake fluid because the pressure valve 1 only has to form a unit as installation aid.

Figure 6:
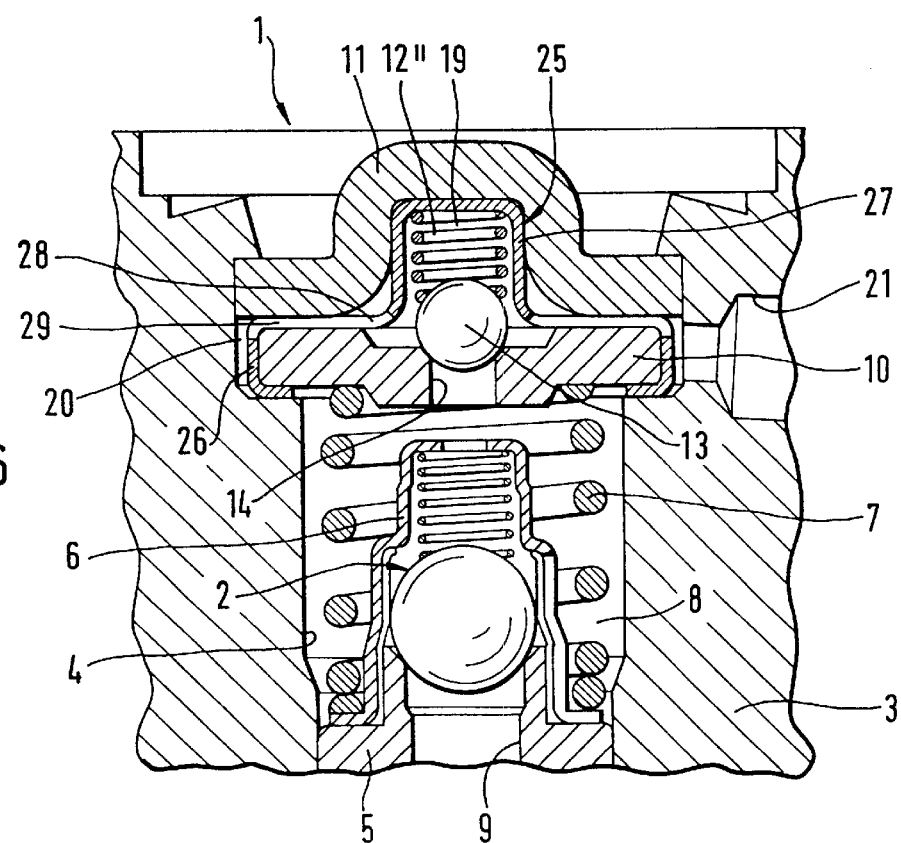
FIG. 6 a further sectional view of a sixth embodiment of a pressure valve according to the present invention.

FIG. 6 shows a sixth embodiment of the present invention. An additional holding element is used for connecting the valve seat body 10 with the valve cover body 11: a spring cup in the form of a connecting device. In this embodiment the connection of the valve seat body 10 with the valve cover body 11 is therefore not temporary—as is the case with the above-described adhesive connection—but is permanent instead. The spring cup 25 is fastened into the valve cover body 11 by press fitting or similar. Fastening of the spring cup 25 to the valve seat body is achieved by the end section 26 of the spring cup 25 being beaded around the valve seat body 10. A cross-section of the spring cup 25 shows that it is mainly U-shaped in the base section 27 where the coil spring 12" is guided. A horizontal middle section 28 running parallel to the valve seat body 10 adjoins the base section 27. Instead of the grooves 18 which are formed in the valve seat body 10 or the valve cover body 11 in the embodiments shown in FIGS. 1 to 5, in this embodiment the spring cup 25 has openings or recesses 29 stamped in its middle section 28 which act as connection between the chamber 19 and the channel 21.

Figure 7:
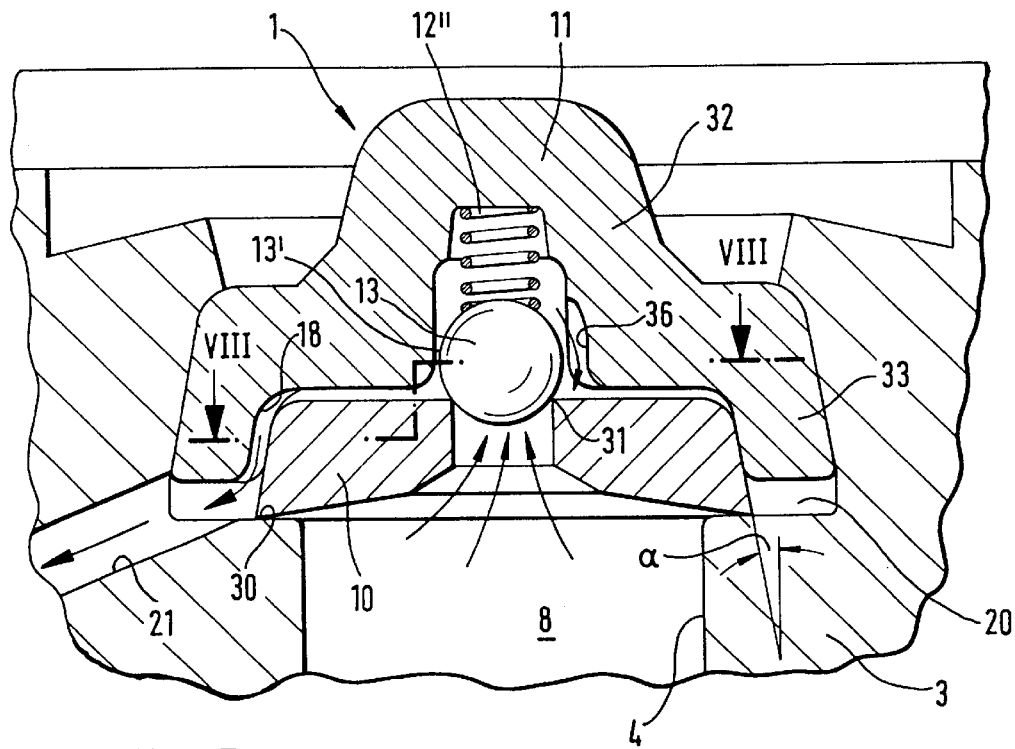
FIG. 7 a longitudinal view of a seventh embodiment of a pressure valve according to the present invention.
Figure 8:
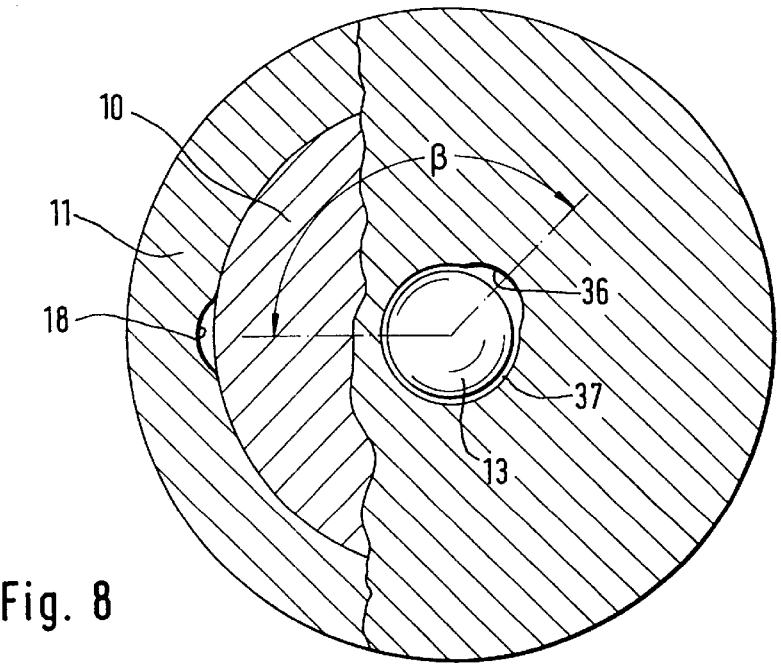
FIG. 8 a sectional view of the seventh embodiment shown in FIG. 7 along the dash-dotted line VIII—VIII.

A seventh embodiment of the present invention is described in connection with FIGS. 7 and 8. FIG. 7 shows a cross-section of a pressure valve 1 according to the present invention and FIG. 8 shows a cross-section view along the dash-dotted line VIII—VIII in FIG. 7. The pressure valve 1 shows a valve seat body 10 which is preferably designed as a valve plate made of steel and a valve cover body 11 which is preferably a stamped part made of aluminum. On its side facing the pressure chamber 8, the valve seat body 10 has a sealing edge 30 around its circumference. Furthermore, the valve seat body 10 also has a valve seat 31. A particularly sharp edged design of the valve seat 31 has the effect that the brake fluid can flow out sideways immediately after passing the narrowest cross-section when pressure valve 1 is opened. This means that it is not necessary for the (brake) fluid to flow around the ball 13. The outer edge of the valve seat body 10 slopes at an angle α. The valve cover body 11 has a radial inner section 32 with U-shaped cross-section and a radial outer section 33 which also has a U-shaped cross-section. The inner diameter of the inner section 32 which serves in particular to provide stability for the ball 13 and guiding of the coil spring 12" corresponds mainly with the diameter of ball 13. This means that the guiding of ball 13 is tight and precise, i.e. with very little play, which avoids any "dancing" by ball 13 as could be caused by burbling. The inner diameter of the outer section 33 corresponds mainly with the outer diameter of the valve seat body 10. The outer section 33 clasps the valve seat body 10 and is also angled on its inner side at an angle α. The angle α in this case is smaller than the critical angle for self-locking so that both components 10 and 11 hold together by themselves and the pressure valve 1 can be handled and tested as a separate sub-assembly. It should also be pointed out that both the valve seat body 10 and the valve cover body 11 can be manufactured in one clamping.

A groove 18 formed in the outer section 33 of the valve cover body 11, which can also be described as the outflow opening, serves as connection between the space 19 with the ring chamber 20 and the channel 21. Furthermore, the outer section 33 of the valve cover body 11 has the advantage of an embossed additional opening 36. The illustration in FIG. 8 shows that the groove 18 and the additional opening 36 on the inside of the outer section 33 are set at angle β to each other. When pressure valve 1 is opened, the brake fluid flows out of the space 19, around the ball 13 and through the additional opening 36 as indicated by the arrows in FIG. 7. In addition to this, an equally large volume of brake fluid is forced out of the space 19 through the ring gap 37 around ball 13 for tolerance reasons. The resulting force on the ball 13 can therefore be influenced by setting the angle β, thus providing a preferred abutting surface for the ball 13.

The design example as shown in FIGS. 7 and 8 is characterized by a particular construction-related noise reduction. The pressure valve is pre-mounted and forms a unit during operation as well because of the self-locking design. The installation of the pressure valve in the pump housing 3 is carried out in two stages. In the first stage, the pressure valve 1 is pressed onto the valve seat body 10 in order to ensure a tight seal. Following this, a probe is mounted onto the outside of the pressure valve 1 which is used for testing the pressure valve 1 during a pump trial run. A sealing section of the probe outside the pump housing 3 provides the required seal for operating the pressure valve 1. Finally, upon successful completion of the test, the pressure valve 1 is caulked into place while retaining the original test position and is therefore pressure-tight and cannot be removed from the valve block.

What is claimed is:

1. Pressure valve assembly for conveying pressure fluid in a slip-controlled hydraulic brake system, comprising:
   a valve cover body;
   a valve seat body including a valve seat formed by a recess adjoining and concentric to a central hole;
   a pretension element residing in a space formed between the valve seat body and the valve cover body; and
   a ball biased by the pretension element against the valve seat,
   wherein the valve seat body is attached to a housing by caulking, and
   wherein at least one of the valve seat body and the valve cover body are manufactured by a non-cutting method.

2. Pressure valve assembly of claim 1, wherein said recess comprises a conical recess, and wherein the central hole has a diameter approximately equal to a radius of the ball, and wherein the conical recess has an outer diameter larger than a diameter of the ball such that the ball is biased into the conical recess by the pretension element.

3. Pressure valve assembly of claim 2, further including a recess formed around the conical recess in the valve seat body and a plurality of grooves extending radially outward from the recess to conduct fluid out from the space formed between the valve seat body and the valve cover body.

4. Pressure valve assembly of claim 2, wherein the pretension element is attached to the valve seat body by caulking.

5. Pressure valve assembly of claim 2, wherein the pretension element comprises a spiral spring.

6. Pressure valve assembly of claim 2, wherein the pretension element comprises a metal plate.

7. Pressure valve assembly of claim 2, wherein the pretension element comprises a coil spring, and wherein the recess has a diameter larger than a diameter of the coil spring, and wherein the diameter of the recess is larger than a diameter of the ball such that the ball completely resides within the recess when biased by the coil spring.

8. Pressure valve assembly of claim 7, wherein the valve cover body includes a step-like section for mounting one end of the coil spring.

9. Pressure valve assembly of claim 8, wherein a diameter of the step-like section is approximately equal to the diameter of the recess.

10. Pressure valve assembly of claim 8, wherein the step-like section is positioned coaxially with respect to the recess.

11. Pressure valve assembly of claim 7, further including a plurality of grooves extending radially outward from an edge section of the valve cover body.

12. Pressure valve assembly of claim 1, wherein the valve cover body includes a pot-shaped section, and wherein the pretension element comprises a coil spring having one end mounted in the pot-shaped section of the valve cover body.

13. Pressure valve assembly of claim 12, further including a spring cup having a base section positioned within the pot-shaped section of the valve cover body, a middle section positioned between the valve cover body and the valve seat body, and end sections positioned between the valve cover body and a housing.

14. Pressure valve assembly of claim 13, wherein the spring cup includes at least one opening in the middle section for providing fluid communication between one or more chambers of the housing.

15. Pressure valve assembly of claim 12, further including a plurality of grooves extending radially outward from an edge section of the valve cover body.

16. Pressure valve assembly of claim 12, wherein the valve cover body includes a radial inner section and a radial outer section, and wherein the valve seat body includes a valve seat and a sealing edge, and wherein a diameter of the radial inner section is approximately equal to a diameter of the ball, and wherein a diameter of the radial outer section is approximately equal to a diameter of the valve seat body.

17. Pressure valve assembly of claim 16, wherein an outer edge of the valve seat body slopes at an angle, $\alpha$.

18. Pressure valve assembly of claim 16, wherein an inner side of the radial outer section slopes at an angle, $\alpha$.

19. Pressure valve assembly of claim 16, further including a groove formed in the radial outer section of the valve cover body.

20. Pressure valve assembly of claim 19, wherein the radial outer section includes an opening at an angle, $\beta$, with respect to the groove.

* * * * *